(12) United States Patent
Jones

(10) Patent No.: US 6,438,287 B1
(45) Date of Patent: Aug. 20, 2002

(54) DISPERSION COMPENSATION

(75) Inventor: Kevan P Jones, Totnes (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/338,693

(22) Filed: Jun. 23, 1999

(51) Int. Cl.⁷ .................................................. G02B 6/26
(52) U.S. Cl. ............................ 385/27; 385/39; 385/37; 385/24; 359/341.1
(58) Field of Search .............................. 385/24, 27, 37, 385/39; 359/341.1, 173, 341.3

(56) References Cited

U.S. PATENT DOCUMENTS

| | | |
|---|---|---|
| 4,953,939 A | 9/1990 | Epworth |
| 5,404,413 A | 4/1995 | Delavaux et al. |
| 5,636,301 A | 6/1997 | O'Sullivan et al. |
| 5,837,169 A | 11/1998 | Rourke |

FOREIGN PATENT DOCUMENTS

| | | | |
|---|---|---|---|
| EP | 0 810 699 A2 | 12/1997 | ............. H01S/3/06 |
| EP | 0 810 699 A3 | 5/1998 | ............. H01S/3/06 |
| EP | 0 878 721 A1 | 11/1998 | |
| JP | 08204258 A * | 8/1996 | ............. H01S/3/07 |
| JP | 09036814 | 2/1997 | ........... H04B/10/22 |
| JP | 10256633 | 9/1998 | ............. H01S/3/10 |
| JP | 11046167 | 2/1999 | ........... H04B/10/17 |
| JP | 11122171 | 4/1999 | ........... H04B/10/02 |

* cited by examiner

*Primary Examiner*—Frank G. Font
*Assistant Examiner*—Layla Lauchman
(74) *Attorney, Agent, or Firm*—Lee, Mann, Smith, McWilliams, Sweeney & Ohlson

(57) ABSTRACT

The intrinsic optical loss exhibited by a circulator-based optical fiber chirped Bragg reflection grating optical fibre dispersion compensator is compensated by including a length of amplifying fibre in the path between the circulator and the Bragg grating, this amplifier fibre being optically pumped by pump power launched into the amplifier fibre from the far side of the Bragg grating.

5 Claims, 2 Drawing Sheets

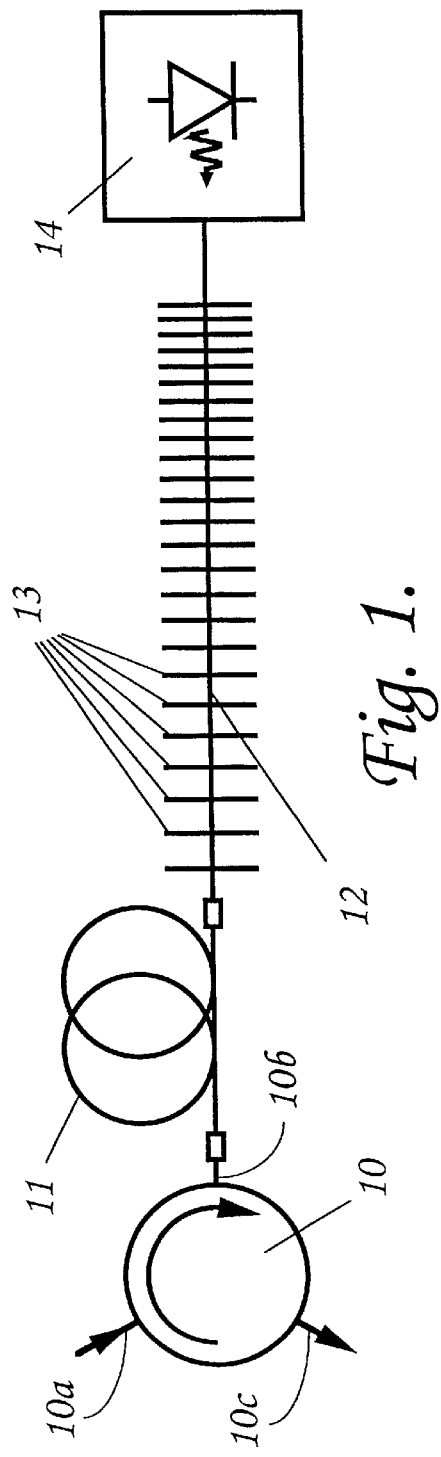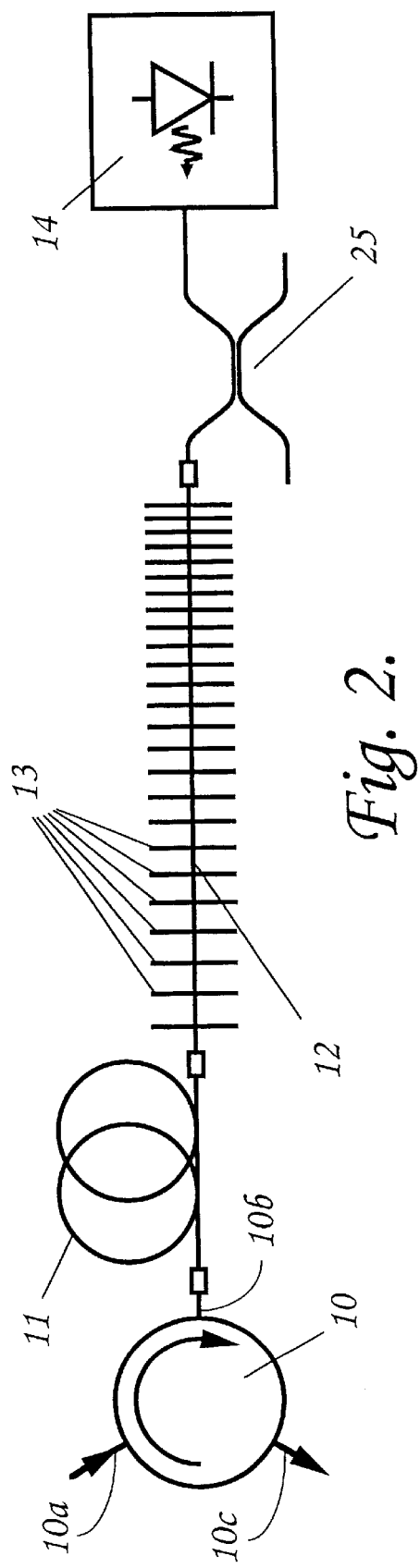

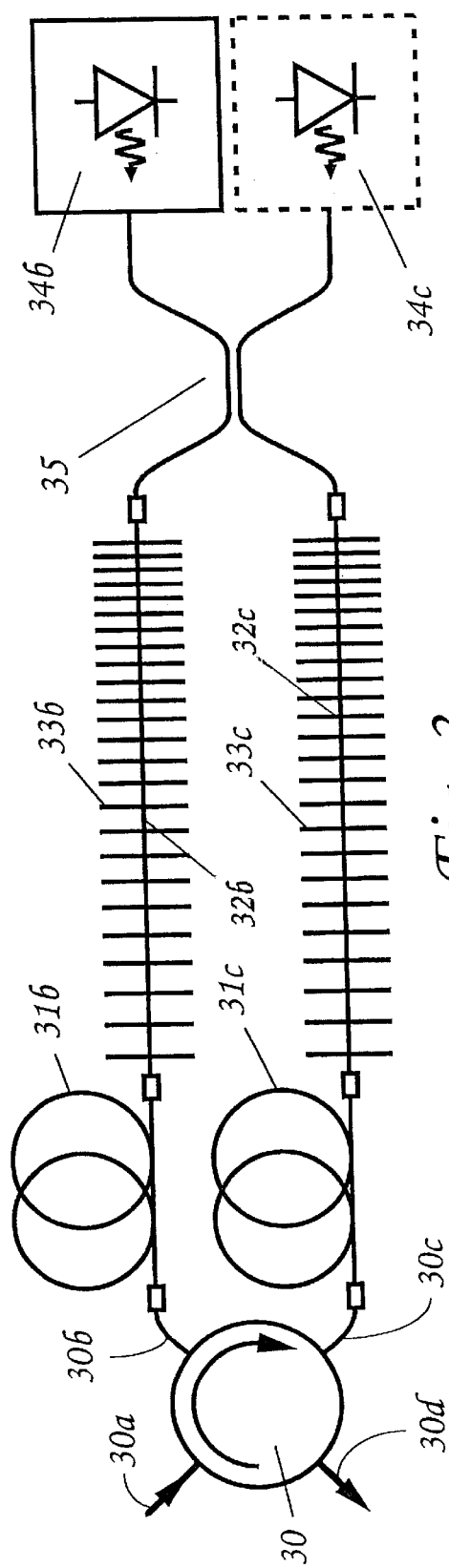
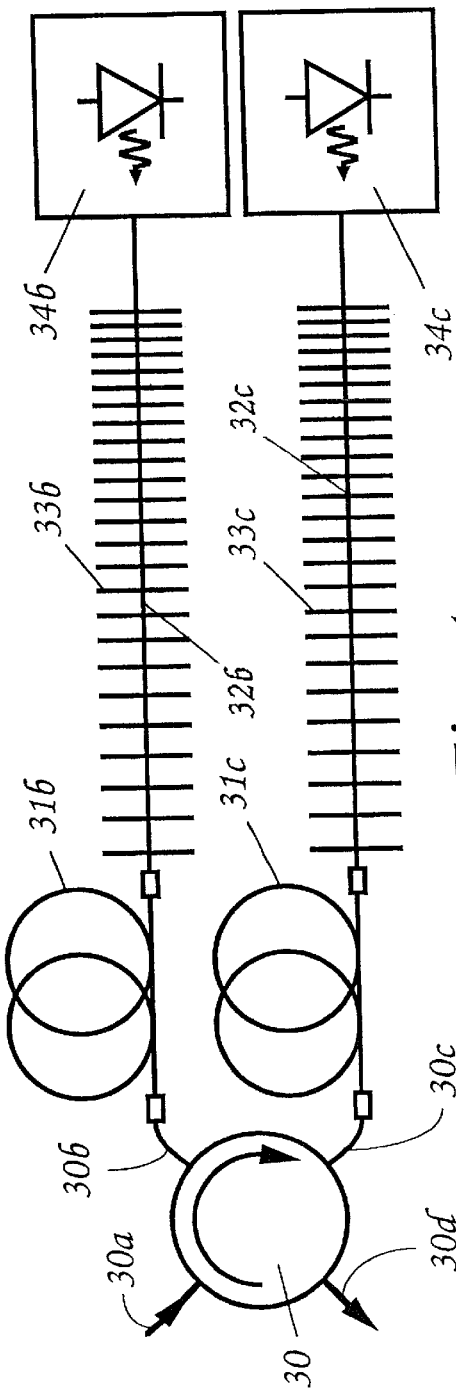

DISPERSION COMPENSATION

FIELD OF THE INVENTION

This invention relates to compensation of chromatic dispersion (hereinafter simply referred to as dispersion) encountered in optical waveguides.

BACKGROUND TO THE INVENTION

In optical transmission systems, one of the ways of compensating for the dispersion produced by standard transmission fibre is to include in the transmission path one or more lengths of dispersion compensating fibre. This dispersion compensating fibre also exhibits dispersion, but the sign of the dispersion is the opposite of that exhibited by standard transmission fibre. Moreover the modulus of that dispersion is significantly larger, typically about four times larger, than that of standard transmission fibre, and in consequence the dispersion of long lengths of standard transmission fibre can be compensated by the use of significantly shorter lengths of dispersion compensating fibre. Amongst the drawbacks of this approach to dispersion compensation is the fact that dispersion compensating fibre is typically significantly more lossy and expensive than standard transmission fibre. Moreover its properties are generally considered not suitable for deployment of this fibre in the field, and so the effective span length is not the aggregate length, but only that of the standard transmission fibre.

An alternative approach to dispersion compensation is described in U.S. Pat. No. 4,953,939, this approach involving the use of a chirped Bragg reflection grating in a length of single mode optical fibre waveguide. Initially problems were encountered in the writing of long gratings section by section without unacceptably degrading the performance through the presence of stitch errors where individual sections fail to register quite correctly with their adjacent sections. However, with the advent of forms of active section alignment, such as described in U.S. Pat. No. 5,837,169, or in European Patent Application No. 0 878 721, it has been found feasible to create acceptable quality dispersion compensators employing chirped Bragg reflection gratings of between 2 and 3 metres in length. However these also exhibit significant loss. Typically, this loss may amount to between 5 and 11 dB, and amongst the factors contributing to this loss is the loss of the special fibre in which the Bragg reflection grating is formed, the loss incurred by the writing process employed for creating the grating, loss incurred by mode conversion by the grating into radiative cladding modes, loss arising from the fact that the grating is not fully saturated, and losses incurred by the propagation of the light twice through the circulator.

SUMMARY OF THE INVENTION

A primary object of the present invention is to provide a form of dispersion compensator of the circulator and Bragg reflection grating type that has reduced or eliminated loss.

According to a first aspect of the present invention there is provided a dispersion compensator having an optical amplifier optical pump optically coupled with one port of an optical circulator via an optical waveguide, which optical waveguide includes a chirped Bragg reflection grating and, between the grating and the circulator, a length of optically amplifying waveguide.

A superficial resemblance can be found between a dispersion compensator according to the present invention and the gain compensated optical amplifier of U.S. Pat. No. 5,636,301. Though both devices involve the use of circulators, optically amplifying waveguides and Bragg reflection gratings, the devices are in fact quite different devices. In particular the present invention is directed to dispersion compensation, whereas the gain compensated optical amplifier of U.S. Pat. No. 5,636,301 is not only not concerned with dispersion compensation, it is additionally incapable of functioning as a dispersion compensator. This is because it is specifically a device whose component Bragg reflection gratings have reflection wavebands that are spectrally separated by spectral guard bands, and accordingly any attempt to use the gain compensated optical amplifier of U.S. Pat. No. 5,636,301 for dispersion compensation of a signal would serve to punch spectral holes in that signal.

The optical coupling between the optical pump and the circulator may include a wavelength multiplexing coupler between the optical pump and the Bragg grating in order to divert any signal power not reflected by the Bragg grating away from entering the optical pump.

According to a second aspect of the present invention, there is provided a dispersion compensator having an optical amplifier optical pump optically coupled via a power splitter with two adjacent ports of a four-port optical circulator via respective optical waveguides optically in parallel, each of which optical waveguides includes a chirped Bragg reflection grating and, between the grating and the circulator, a length of optically amplifying waveguide. Alternatively, the power splitter may be dispensed with, and a separate pump used for pumping each of the optical amplifiers.

The amplification that is required in these dispersion compensators to offset their lossy components is typically significantly less than that typically required of optical amplifiers employed in transmission highways, and hence the pump power requirements, and consequential cost, are correspondingly smaller.

Other features and advantages of the invention will be readily apparent from the following description of preferred embodiments of the invention, from the drawings and from the claims.

BRIEF DESCRIPTION OF THE DRAWINGS

FIGS. 1 to 4 are schematic depictions of four dispersion compensators embodying the present invention in alternative preferred forms.

DETAILED DESCRIPTION OF PREFERRED EMBODIMENTS

Referring to FIG. 1, a dispersion equaliser has a 3-port optical circulator 10 which has ports 10*a*, 10*b* and 10*c* arranged such that light launched into the circulator respectively by way of ports 10*a*, 10*b* and 10*c* emerges from the circulator respectively by way of ports 10*b*, 10*c* and 10*a*. Ports 10*a* and 10*c* constitute respectively the input and output of the dispersion equaliser. Optically coupled with port 10*b* of the circulator is one end of a length of optically amplifying waveguide 11, typically constituted by a length of erbium doped optical fibre waveguide. Optically coupled with the other end of the waveguide 11 is a length of optical waveguide 12 in which has been formed a chirped Bragg reflective grating 13. The extent of the chirp of grating 13 is chosen to provide that grating with a reflection waveband that covers the spectral range over which the dispersion compensator is designed to operate. The rate of chirp, which is typically, but not necessarily, linear determines the amount of dispersion compensation that the compensator provides. Optically coupled with the other end of the waveguide 12 is an optical pump 14 for the amplifying waveguide 11, for instance a laser diode. The optical couplings between the waveguides 11 and 12 and between waveguide 11 and port 10b of the circulator 10 are typically fused fibre splices.

The modulation depth of the individual grating elements of grating 13 will normally be chosen to make the grating only slightly less than 100% reflective over the signal waveband, and so very little of any signal power that is launched into port 10a of circulator 10 will reach pump source 14. In the event that this residual power is thought to be potentially sufficient to upset the proper operation of the pump, it can be filtered out, for instance by means of a 2×2 wavelength multiplexing waveguide directional coupler. FIG. 2 depicts a dispersion equaliser identical with that of FIG. 1 except for the inclusion of such a coupler 25 spliced in between the source 14 and the grating waveguide 12.

FIG. 3 discloses a dispersion compensator which, unlike the dispersion compensators of FIGS. 1 and 2, uses a 4-port optical circulator 30 instead of the 3-port circulators used in the dispersion compensators of FIGS. 1 and 2. This 4-port optical circulator 30 which has ports 30a, 30b, 30c and 30d arranged such that light launched into the circulator respectively by way of ports 30a, 30b 30c and 30d emerges from the circulator respectively by way of ports 30b, 30c, 30d and 30a. Ports 30a and 30d constitute respectively the input and output of the dispersion equaliser. Optically coupled with port 30b of the circulator is one end of a length of optically amplifying waveguide 31b, typically constituted by a length of erbium doped optical fibre waveguide. Optically coupled with each one of ports 30b and 30c of the circulator is one end of a respective one of two lengths of optically amplifying waveguide 31b and 31c, typically constituted by a length of erbium doped optical fibre waveguide. Optically coupled with the other ends of the waveguides 31b and 31c is a respective one of two lengths of optical waveguide 32b and 32c in each of which has been formed a respective one of two chirped Bragg reflective gratings 33b and 33c. The other ends of the waveguides 32b and 32c are optically coupled with an optical pump 34b, for instance a laser diode, by means of a power splitter, for instance a 2×2 waveguide 3 dB directional coupler 35. Optionally, the pump power available for pumping the can be boosted by the provision of an additional pump 34c optically coupled with the free port of 3 dB coupler 35. Alternatively, the power splitter may be dispensed with, as depicted in the dispersion compensator of FIG. 4, and the two amplifying waveguides 31b and 31c separately pumped by their associated pumps 34b and 34c.

In this dispersion compensator of FIG. 3, the light that is launched into port 30a of circulator 30 undergoes a first amount of dispersion by virtue of its wavelength-dependent distributed reflection in grating 33b, and then undergoes additional dispersion by virtue of its wavelength-dependent distributed reflection in grating 33c.

What is claimed is:

1. A dispersion compensator having an optical amplifier optical pump optically coupled with one port of an optical circulator via an optical waveguide, which optical waveguide includes a single Bragg reflection grating and, between the grating and the circulator, a length of optically amplifying waveguide.

2. A dispersion compensator having an optical amplifier optical pump optically coupled with one port of an optical circulator via an optical waveguide, which optical waveguide includes a Bragg reflection grating and, between the grating and the circulator, a length of optically amplifying waveguide wherein the Bragg grating is reflective over a first spectral waveband and the optical pump is emissive over a second spectral waveband, and wherein the optical coupling between the optical pump and the circulator includes a wavelength multiplexing coupler between the optical pump and the Bragg grating, which multiplexing coupler multiplexes said first and second wavebands.

3. A dispersion compensator having an optical amplifier optical pump optically coupled via a power splitter with two adjacent ports of a four-port optical circulator via respective optical waveguides optically in parallel, each of which optical waveguides includes a chirped Bragg reflection grating and, between the grating and the circulator, a length of optically amplifying waveguide.

4. A dispersion compensator as claimed in claim 3, wherein the power splitter is a four-port power splitter, and wherein a second optical pump is optically coupled with the power splitter such that it shares the power of both optical pumps between both of said waveguides.

5. A dispersion compensator having two optical amplifier optical pumps optically coupled respectively with two adjacent ports of a four-port optical circulator via respective optical waveguides optically in parallel, each of which optical waveguides includes a chirped Bragg reflection grating and, between the grating and the circulator, a length of optically amplifying waveguide.

* * * * *